(12) United States Patent
Frydman et al.

(10) Patent No.: US 7,991,940 B2
(45) Date of Patent: Aug. 2, 2011

(54) COMMUNICATION PROCESSOR BOARD

(75) Inventors: Daniel Frydman, Haifa (IL); Abraham Fisher, Hal'a (IL)

(73) Assignee: Surf Communication Solutions Ltd., Yokneam (IL)

(*) Notice: Subject to any disclaimer, the term of this patent is extended or adjusted under 35 U.S.C. 154(b) by 860 days.

(21) Appl. No.: 11/989,438

(22) PCT Filed: Jul. 25, 2005

(86) PCT No.: PCT/IL2005/000793
§ 371 (c)(1),
(2), (4) Date: Jan. 24, 2008

(87) PCT Pub. No.: WO2007/013051
PCT Pub. Date: Feb. 1, 2007

(65) Prior Publication Data
US 2010/0262749 A1    Oct. 14, 2010

(51) Int. Cl.
G06F 13/20    (2006.01)
(52) U.S. Cl. .................. 710/315; 710/311; 711/147
(58) Field of Classification Search .......... 710/315, 710/52, 305–306, 311–312; 711/147; 326/38
See application file for complete search history.

(56) References Cited

U.S. PATENT DOCUMENTS

| | | |
|---|---|---|
| 5,381,541 A | 1/1995 | Begun et al. |
| 5,410,654 A | 4/1995 | Foster et al. |
| 6,021,456 A | 2/2000 | Herdeg et al. |
| 6,151,390 A | 11/2000 | Volftsun et al. |
| 6,806,730 B2 | 10/2004 | Bailis et al. |
| 2002/0176234 A1 | 11/2002 | Sawada et al. |
| 2003/0147473 A1 | 8/2003 | Ozu |
| 2003/0208652 A1 | 11/2003 | Kuhlmann et al. |
| 2004/0044902 A1 | 3/2004 | Luthi |
| 2005/0149651 A1 | 7/2005 | Doak et al. |

FOREIGN PATENT DOCUMENTS

EP    0 589 743    3/1994

OTHER PUBLICATIONS

D. Husak: "Network processors: A definition and comparison"; Freescale Semiconductor White paper, downloaded from http://www.freescale.com/files/netcomm/doc/white_paper/COM-MPROCWP.pdf?fsrch=1 on Mar. 5, 2000; 8 pages.

*Primary Examiner* — Clifford H Knoll
(74) *Attorney, Agent, or Firm* — D. Kligler I.P. Services Ltd

(57) ABSTRACT

A signal processing board including a resource board substrate, an external interface on the board substrate, adapted to receive signals for processing, at least one slot adapted to receive a plug-in module with at least one processor thereon and an interface unit adapted to at least participate in converting signals exchanged between the external interface and a processor on a module received by the slot, between a format of signals received by the external interface and a signal format of the processor. The interface unit is suitable to at least participate in the conversion for a plurality of types of processors that differ in the format in which they transmit or receive signals.

24 Claims, 6 Drawing Sheets

COMMUNICATION PROCESSOR BOARD

FIELD OF THE INVENTION

The present invention relates to communication systems and in particular to processor boards for handling communication connections.

BACKGROUND OF THE INVENTION

Many providers of communication services employ one or more communication servers, such as video gateways, access routers, and voice over IP gateways. The communication servers may act as video gateways, modems, fax handlers, voice over Internet Protocol (VoIP) servers and/or may provide any other communication services for a plurality of channels (referred to also as connections).

In some cases, DSP resource boards including a plurality of processors are used in the communication server. The DSP resource boards are generally used to perform specific tasks which require large amounts of processing power for relatively simple and/or repetitive tasks. Generally, each DSP resource board is planned for a specific configuration including a specific external interface and a specific processor layout. All the processors on a single DSP resource board that serve in directly handing signals have the same type of external interface.

U.S. patent publication 2003/0147473 to Ozu, U.S. Pat. No. 6,021,456 to Herdeg et al., U.S. patent publication 2004/0044902 to Luthi, U.S. patent publication 2002/0176234 to Sawada et al. and U.S. Pat. No. 5,381,541 to Begun et al., the disclosures of all of which are incorporated herein by reference, describe some such multi-processor DSP resource boards.

As technology advances, the number of different types of communication services increases. In order to compete in providing communication services, it is desired to provide a wide range of services. Therefore, communication providers are required to manage a large number of communication resource boards, supporting a large number of configurations, e.g., different interfaces, form factors and different processing abilities.

SUMMARY OF THE INVENTION

An aspect of some embodiments of the present invention relates to a signal processing resource board adapted to operate with a plurality of processors with different types of interfaces. The different types of interfaces may include, for example, different physical interfaces (e.g., different numbers of legs, different leg arrangements) and/or different signal transfer protocols. The use of a modular board which may be used with processors of different types of interfaces allows adaptation of boards to the current tasks of the system in which the board is deployed.

One or more conversion paths along the board, leading between an external interface of the board and each of the one or more processors of the board, convert the signals between an external format of the external signal source and a format of the corresponding processor of the path.

In some embodiments of the invention, the resource board includes an interface unit which is included in a plurality and optionally in all the conversion paths along the board. The interface unit optionally converts between the external format and an internal format of the board. Other units along the paths convert the signals from the internal board format into formats of the processors. Thus, each path has at least two separate units (e.g., which optionally are situated on different chips) which perform the conversion in a distributed manner. Performing a distributed conversion reduces the complexity of the units performing the conversion. Alternatively, the interface unit performs all the conversion tasks of all the paths, i.e., it converts a plurality of external formats to a plurality of processor formats.

Optionally, the data signals transmitted between the separate units along the conversion path are encapsulated in packets of an internal format of the board. In an exemplary embodiment of the invention, the signal conversion is performed in two stages. In a first stage, the signals are converted between an external format and the internal format of the board. In a second stage, the signals are converted between the internal format of the board and the processor format, e.g., by the below mentioned translator associated with the processor. Optionally, the conversion in the first stage is independent of the processor format. That is, the conversion in the first stage is the same, regardless of the type of processor to which the signals are directed. In some embodiments of the invention, the conversion in the second stage is independent of the external format currently supported by the board. Optionally, the same firmware or software process is used to perform the second stage, regardless of the external format in which the signals are received by the board, as the second stage receives the signals in the internal format.

In some embodiments of the invention, the board includes one or more slots adapted to receive processor-carrying plug-in modules of a plurality of different types. Optionally, each plug-in module carries a translator which converts between the processor format of the processors of the module and a continuation of the conversion path, e.g., the internal board format. The translator may be firmware configurable or may be permanently hardware coded. Alternatively, a same programmable translator is used for a plurality of different processors. Optionally, in accordance with this alternative, the translator is not replaced with the plug-in module. Instead, for each type of processor, a respective firmware process is loaded into the translator. In some embodiments of the invention, the loading of the respective software into the translator is performed automatically. At start up and/or when a module is replaced, the type of the processors of the module is identified and accordingly a firmware process is selected from a permanent memory including a library of processes for different types of processors. Thus, processors may be replaced for updating and/or due to varying needs, without changing the entire board, but rather by changing only the processor itself or only a module carrying the processor. Optionally, the board is designed to allow hot swapping of the modules.

Alternatively or additionally to including slots adapted to receive plug-in modules, the board is adapted to operate concurrently with a plurality of processors of different types.

The use of plug-in modules reduces to a minimum the adaptations required in order to support a processor of a new format. As the interfaces of the board are standard, all that is needed is to design a plug-in module with the new processor format and to generate firmware or an ASIC to perform the translations between the board format and the new processor format.

An aspect of some embodiments of the present invention relates to a multi-processor resource board adapted to operate with an array of signal handling processors including processors of different types. The processors are optionally organized logically in parallel such that signals provided to the resource board can be handled by any of the processors. Optionally, the multi-processor board comprises a media processing board for telecommunication infrastructure. Alternatively or additionally, the multi-processor board has a rack interface for being employed in a rack of a plurality of parallel boards of similar or even identical interfaces.

The different types of processors optionally differ in one or more of the tasks they are configured to perform, their physical interface (e.g., number of pin-outs), their protocol interface, physical design, architecture, power consumption and/or required peripherals. The use of a multi-processor board with different types of processors, allows better adaptation of resources to the processing needs.

Optionally, the multi-processor board is adapted to handle signals received in a plurality of different external formats (e.g., Utopia, Ethernet, Rapid I/O, PCI express). In some embodiments of the invention, at any specific time, the multi-processor board receives signals in a single format. A storage unit, such as a flash memory, optionally stores a plurality of firmware processes each of which is adapted to perform conversion of a specific external format. When the multi-processor board is connected to an external interface, a firmware process corresponding to the external interface is loaded into a conversion unit of the board. Alternatively, the multi-processor board may receive signals in a plurality of different external formats concurrently, through a plurality of respective interfaces (e.g., through separate pins). Further alternatively, the multi-processor board is adapted for operation in accordance with only a single external format.

An aspect of some embodiments of the present invention relates to a resource board in which the processors are adapted to communicate with each other without the signals they exchange passing through a central unit of the resource board. The central unit is a unit through which signals received by the resource board from an external interface pass on their way to processors of the board. Communication between the processors without passing through the central unit reduces the load on the central unit and/or allows communication between a pair of processors, while signals to a third processor pass through the central unit. In addition, a first pair of processors can optionally communicate with each other using a first bus 154 concurrently with a second pair of processors communicating using a second bus 154, without the communications on the different buses 154 interfering with each other.

In some embodiments of the invention, each processor is associated with a translator which translates signals the processor transmits to or receives from other processors or the central unit into an internal format of the board. The translators optionally also control the transmission between two processors.

An aspect of some embodiments of the present invention relates to a resource board in which at least some of the processors are mounted on detachable modules. In some embodiments of the invention, all the processors of the resource board are mounted on detachable modules.

In some embodiments of the invention, each module includes one or more translators which convert the signals directed to the processor into a format supported by the processor. Optionally, the translator is software or firmware configurable and the module further includes a memory unit storing the firmware required by the translator. Alternatively, the firmware required by the translator is stored on a main part of the board and not on the module, in order to make more room on the module for processors.

There is therefore provided in accordance with an exemplary embodiment of the invention, a signal processing board, comprising a resource board substrate, an external interface on the board substrate, adapted to receive signals for processing, at least one slot adapted to receive a plug-in module with at least one processor thereon and an interface unit adapted to at least participate in converting signals exchanged between the external interface and a processor on a module received by the slot, between a format of signals received by the external interface and a signal format of the processor, the interface unit is suitable to at least participate in the conversion for a plurality of types of processors, differing in the format in which they transmit or receive signals. Optionally, the resource board substrate has an area of less than 150 square centimeters. Optionally, the external interface comprises an AMC interface. Optionally, the at least one slot is adapted to receive a plug-in module which is thin relative to width of the module, the at least one slot being adapted to receive the plug-in module in a direction substantially parallel to the substrate.

Optionally, the interface unit is adapted to convert signals from the external interface into a format which is independent of the format of signals received by the external interface, except for characteristics of the format that effect the provision of the signals to the processor.

Optionally, the interface unit is adapted to convert signals from the external interface into a format which is independent of a type of processor to which the signals are directed.

Optionally, the interface unit is adapted to encapsulate signals from the external interface into packets in a format internal to the board and to send the encapsulated signals on toward the at least one slot. Optionally, the interface unit comprises a software or firmware configurable unit and wherein the board comprises a memory configured with a plurality of software or firmware processes from which a process is selected for the interface unit, according to a format of signals received by the external interface.

Optionally, the at least one slot comprises at least three slots. Optionally, the board includes at least one module inserted into the at least one slot, the at least one module including one or more processors mounted thereon. Optionally, the board includes a translator mounted on the module, adapted to perform signal conversion tasks not performed by the interface unit, in converting between a format of signals received by the external interface and a format of the processor. Optionally, the translator is hardware encoded with the conversion tasks it is to perform or is firmware or software configured with the conversion tasks it is to perform. Optionally, the board includes a memory storing at least one software or firmware process executable by the translator. Optionally, the memory storing the at least one process executable by the translator is mounted on the module including the translator. Optionally, the memory storing the at least one process executable by the translator is mounted directly on the substrate.

There is further provided in accordance with an exemplary embodiment of the invention, a plug-in module, comprising a module substrate including a connector adapted to fit in a slot of a processing board, at least one processor mounted on the module substrate and at least one translator mounted on the module, configured to convert signals directed to the at least one processor into a format supported by the processor.

Optionally, the at least one translator is firmware configurable. Optionally, the at least one translator is configurable with a software or firmware stored in a memory of a processing board on which the module is mounted.

There is further provided in accordance with an exemplary embodiment of the invention, a signal processing board, comprising an resource board substrate, an external interface on the board substrate, adapted to receive signals for processing, at least one processing module including at least one processor therein, mounted on the substrate and an interface unit adapted to at least participate in converting signals exchanged between the external interface and a processor of a module, between a format of signals received by the external interface and a signal format of the processor, the interface unit is suitable to at least participate in the conversion for a plurality of types of processors, differing in the format in which they transmit or receive signals.

Optionally, the at least one processing module is detachably mounted on the substrate. Alternatively, the at least one processing module is an integral part of the substrate. Optionally, the interface unit is adapted to receive signals from the external interface and encapsulate the signals into packets in a format internal to the board. Optionally, the interface unit is adapted to add an error correction field to the signals encapsulated into packets.

Optionally, the board includes one or more translators adapted to receive packets from the interface unit, to remove the encapsulation and to convert signals from the packets into a format of one of the processors. Optionally, the one or more translators are mounted directly on the substrate. Alternatively, the one or more translators are mounted directly on the processing module.

There is further provided in accordance with an exemplary embodiment of the invention, a multi-processor signal processing board, comprising an resource board substrate, an external interface on the board substrate, adapted to receive signals for processing, a plurality of processors mounted on the substrate arranged in a logical array of signal handling processors and an interface unit adapted to receive signals from the external interface and direct the signals to one or more of the processors for handling, at least two of the processors have different types of external interfaces.

Optionally, the external interface comprises an AMC interface. Optionally, the board includes one or more translators adapted to convert signals directed to each of the processors into a format of the processor to which the signals are directed. Optionally, the interface unit is adapted to encapsulate the signals received from the external interface into packets of an internal format of the board. Optionally, the one or more translators are adapted to remove the packet encapsulation added by the interface unit. Optionally, the one or more translators are configured with a software or firmware. Optionally, the one or more translators comprise field programmable gate arrays FPGAs. Optionally, the board includes a storage unit loaded with a plurality of software or firmware processes suitable for running in the translator for different types of processors. Optionally, the plurality of processors are mounted directly on the substrate. Optionally, the board includes a plurality of modules detachably mounted on the board substrate, at least some of the processors being mounted on one of the modules. Optionally, each of the modules comprises a translator adapted to convert signals directed to the processors of the module into a format of the processors of the module. Optionally, the translator is adapted to operate with a same software or firmware process on received signals in accordance with a plurality of different external formats.

Optionally, the translator is adapted to remove a packet encapsulation added by the interface unit from signals directed to the module. Optionally, the at least two processors of different types of external interfaces differ in the protocols in which they expect to receive signals. Optionally, the at least two processors of different types of external interfaces differ in their physical interface. Optionally, the at least two processors of different types of external interfaces differ in the number of legs they have or in the arrangement of the legs. Optionally, wherein the interface unit comprises a field programmable gate array FPGA. Optionally, the interface unit is adapted to handle external signals of a plurality of different formats.

There is further provided in accordance with an exemplary embodiment of the invention, a multi-processor signal processing board, comprising an resource board substrate, an external interface on the board substrate, adapted to receive signals for processing, a plurality of processors mounted on the substrate arranged in a logical parallel array of signal handling processors and a bus that connects at least two of the plurality of processors, without passing through the external interface.

Optionally, the plurality of processors are mounted on detachable modules mounted on the substrate. Optionally, each of the at least two processors connects to the bus through a translator configured to convert signals between a processor format and an internal board format of the board. Optionally, the external interface may exchange signals with one of the processors, concurrently with two of the processors communicating with each other.

There is further provided in accordance with an exemplary embodiment of the invention, a signal processing board, comprising a resource board substrate, an external interface on the board substrate, adapted to receive signals for processing and at least one slot adapted to receive a plug-in module with at least one processor thereon, such that the processor can communicate with the external interface.

Optionally, the at least one slot comprises a plurality of slots, each adapted to receive a plug-in module with at least one processor thereon, such that the processor can communicate with the external interface.

Optionally, the resource board substrate does not include a media handling processor mounted directly thereon, not through a plug-in module.

There is further provided in accordance with an exemplary embodiment of the invention, a method of providing signals to a processor mounted on a signal processing board, comprising receiving signals by a signal processing board in an external format, converting the received signals into an internal board format, translating the signals from the internal board format into a processor format and providing the signals in the processor format to the processor. Optionally, the converting and translating are performed by separate units. Optionally, converting the received signals comprises encapsulating the signals into packets.

Optionally, the method includes translating the signals from the internal board format into a plurality of different processor formats.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
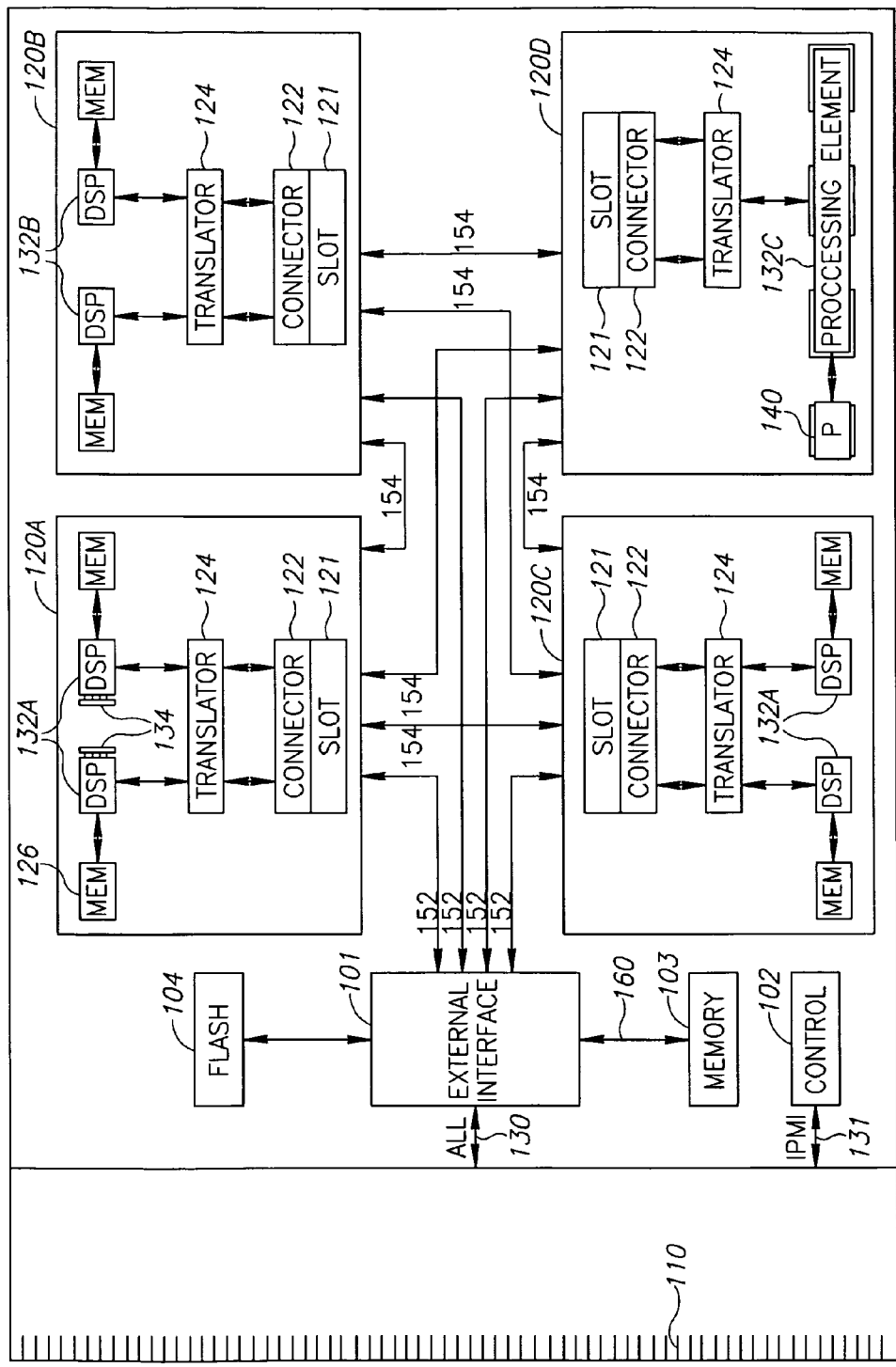
FIG. 1 is a schematic block diagram of a processing board, in accordance with an exemplary embodiment of the present invention.

FIG. 1 is a schematic block diagram of a communication board 100, in accordance with an exemplary embodiment of the present invention. Board 100 includes a plurality (at least two or even at least four) of processing modules 120 (marked 120A, 120B, 120C and 120D), each of which includes one or more processors 132 (marked 132A, 132B and 132C), which are configured for performing intensive processing tasks in parallel. In some embodiments of the invention, board 100 includes at least 4, or even at least 6 processors. In an exemplary embodiment of the invention, board 100 includes 7 processors. In some embodiments of the invention, the number of processors in board 100 is adjustable according to the specific needs of a user employing the board. The number of modules 120 included in board 100 is optionally limited only by the physical size of the board and the power consumption of the modules. While a plurality of modules 120 on board 100 are contemplated in some embodiments of the invention, the advantages of having a board which allows simple replacement of processors having different types of interfaces may be enjoyed also by a board 100 which includes only a single module 120, optionally including only a single processor 132.

Board 100 may be used for a wide variety of processing tasks, for example in gateways, such as mobile gateways, media gateways (e.g., wire-line media gateways) and mobile-to-IP video gateways. In some embodiments of the invention, board 100 may be used for an inter-working function (IWF) and/or IP-PBX tasks. In some embodiments of the invention, board 100 processes voice and/or video signals, for example for performing encryption, decryption, encoding and/or decoding. In some embodiments of the invention, board 100 is used for media processing tasks, such as arrangement of video streams on a combined screen and/or change of video display resolution. Optionally, board 100 may be used in conversion of signals between formats, for example in communication tasks such as, conversion between switched and packet based formats and/or between wireless and PSTN formats. Board 100 is optionally used for modem termination and/or echo cancellation.

In some embodiments of the invention, board 100 is used in voice/video/fax mail handling servers, in interactive voice/video response (IVR) servers, in unified messaging servers and/or in recording servers. Furthermore, board 100 may optionally be used in remote access servers (RAS), conferencing servers, voice quality monitors and/or in interception and security units. Board 100 is optionally also useful for computer telephony interface units.

General Board Layout

Modules 120 optionally receive the data they are to handle over respective buses 152, from an external interface unit 101, which in turn connects to an external unit (not shown) through an external interface line 130 and board connectors 110 (e.g., advanced Mezzanin board (AMC) connectors). In an exemplary embodiment of the invention, connectors 110 are compatible with a plurality of AMC connector formats, optionally all the AMC formats (currently AMC 0, 1, 2, 3 and 4). The term AMC connector or interface refers to a connector that supports at least one of the AMC formats. The external unit may be, for example, an external rack, an external meta-board and/or any other external unit adapted to receive and cooperate with processing boards. External interface line 130 optionally has a sufficient capacity to carry signals transmitted to all the processors 132 on board 100, for example due to its being a high speed interface. In some embodiments of the invention, as discussed hereinbelow, external interface line 130 includes a plurality of segments which support different signal formats.

Interface unit 101 optionally converts signals received from the external unit into an internal standard format of board 100, directs the received signals to a module 120 where they are to be handled and/or schedules the transmission of the signals to the modules. For each processing module 120, board 100 optionally includes a bus 152 which connects the module 120 to interface unit 101. Bus 152 is optionally a wide bus of at least 8 or even at least 16 bits, so that it can transfer all the received data at lower physical transmission rate than on an external narrow bus, without reducing the data transmission rate. In an exemplary embodiment of the invention, bus 152 is twenty bits wide. The lower rate of bus 152 allows time for handling the signals transmitted on the bus, as described below. In an exemplary embodiment of the invention, bus 152 passes over a low voltage differential signal (LVDS) line.

In some embodiments of the invention, board 100 includes intra-module buses 154 for direct communication between modules 120, without passing through interface unit 101. Alternatively or additionally, modules 120 communicate through interface unit 101. In some embodiments of the invention, board 100 includes a shared memory 103 used for intra-module communication of data.

A controller 102 optionally controls the operation of board 100 and communicates with an external control unit (not shown), for example using the IPMI standard on a control bus 131. A flash memory 104 optionally stores firmware to be run by interface unit 101 and/or by sub-units (e.g., processors 132, translators) of modules 120, as discussed hereinbelow. Alternatively to a flash memory 104, any other type of permanent memory unit, which does not lose its contents when power is shut off, may be used. The permanent memory may be erasable and rewriteable, such as an EEPROM, or may be a single time writeable memory unit, for example when a large memory unit is used and processors 132 are chosen from a limited set of, possibly predetermined, processor types.

Processing Modules

As mentioned above, each of processing modules 120 comprises one or more processors 132 configured for handling communication signals. Processing modules 120 are optionally not required to have the same type of processors. Hence, in operation of board 100, different modules 120 may have different types of processors 132. In FIG. 1, modules 120A and 120C have a first type of digital signal processors (DSPs) 132A, module 120B has a second type of DSPs 132B and module 120D has a processing element 132C. It is noted that if desired, board 100 may be used with all of its modules 120 having the same type of processor 132. Exemplary processors which may be supported by board 100, include, for example, the TI C6412, C5441 or Janus processors, the Freescale Starcore 8122 or the Intel processors (e.g., Xeon, PXA270 family). Alternatively or additionally, ASIC processors for specific tasks may be used in one or more of the modules 120.

Some or all of modules 120 optionally include memories 126 and/or peripheral units 140, which aid the processors in performing their tasks.

Each of modules 120 optionally includes a translator 124 which receives signals directed to the processor(s) of its module 120 from interface unit 101 and/or from other modules 120, converts the signals into a format supported by the specific processor 132 it services and provides the signals to the processor through a port compatible with the type of the received signals.

Physical Interface of Modules

Modules 120 are optionally plug-in units which are detachably and replaceably mounted onto a substrate forming board 100. In some embodiments of the invention, modules 120 include connectors 122 which fit into respective slots 121 on board 100. Connectors 122 and slots 121 may be of substantially any type known in the art. Furthermore, any other type of mating devices may be used to mechanically and electrically connect modules 120 to board 100.

Processors 132 optionally detachably fit into respective slots 134 in modules 120. Thus, if a processor 132 fails, the processor may be replaced with an equivalent processor. Alternatively or additionally, the user can select from a plurality of different processors fitting into a same slot 134, a processor 132 which best suits a requirement of board 100.

Alternatively or additionally, for example for simplicity of production, the processor(s) 132 are permanently mounted on one or more modules 120, for example being soldered onto the module. Replacement of processors 132 is optionally achieved in these alternatives by replacing their entire module 120.

In some embodiments of the invention, one or more of modules 120 are produced as an integral part of board 100, without the possibility to replace the module, but only the possibility to replace its processors 132. Modules permanently attached to board 100 are optionally modules having processor interfaces that are used by many types of processors 132 and/or modules that support a processor 132 that will definitely be required.

Internal Communication

Signals exchanged between board 100 and external units are optionally in a format imposed by the external unit. In some embodiments of the invention, interface unit 101 is configured to convert the received signals into an internal format of board 100. The signals in the internal format are optionally provided to the translator 124 of their destination module 120, where they are converted into the format of the processor 132 which is to process the signals. The processed signals are returned to translator 124, which converts the signals back into the internal format of board 100 and transfers the signals back to interface unit 101. Interface unit 101 returns the signals into their external format and transfers them over external interface line 130 out of board 100.

Thus, in some embodiments of the invention, the conversion of the signals between the external format and the format of the processor 132 that handles the signals is performed in a plurality of stages. In a first stage, interface unit 101 optionally converts between an external format and an internal format of board 100, without relation to the format supported by the processor 132 to handle the signals. In a second conversion stage, translators 124 convert between the internal format signals and the specific format of the processor 132 handling the signals.

In communicating between two modules, the transmitting processor optionally passes the signals to its translator 124 which converts the signals into the internal format of board 100. The translator 124 transmits the signals to the translator of the destination processor, which translator converts the signals into the format of the receiving processor. The passage of the signals transmitted between processors 132 through translators 124 allows transmission of signals between processors of different types of interfaces within board 100.

Interface Unit

Figure 2:
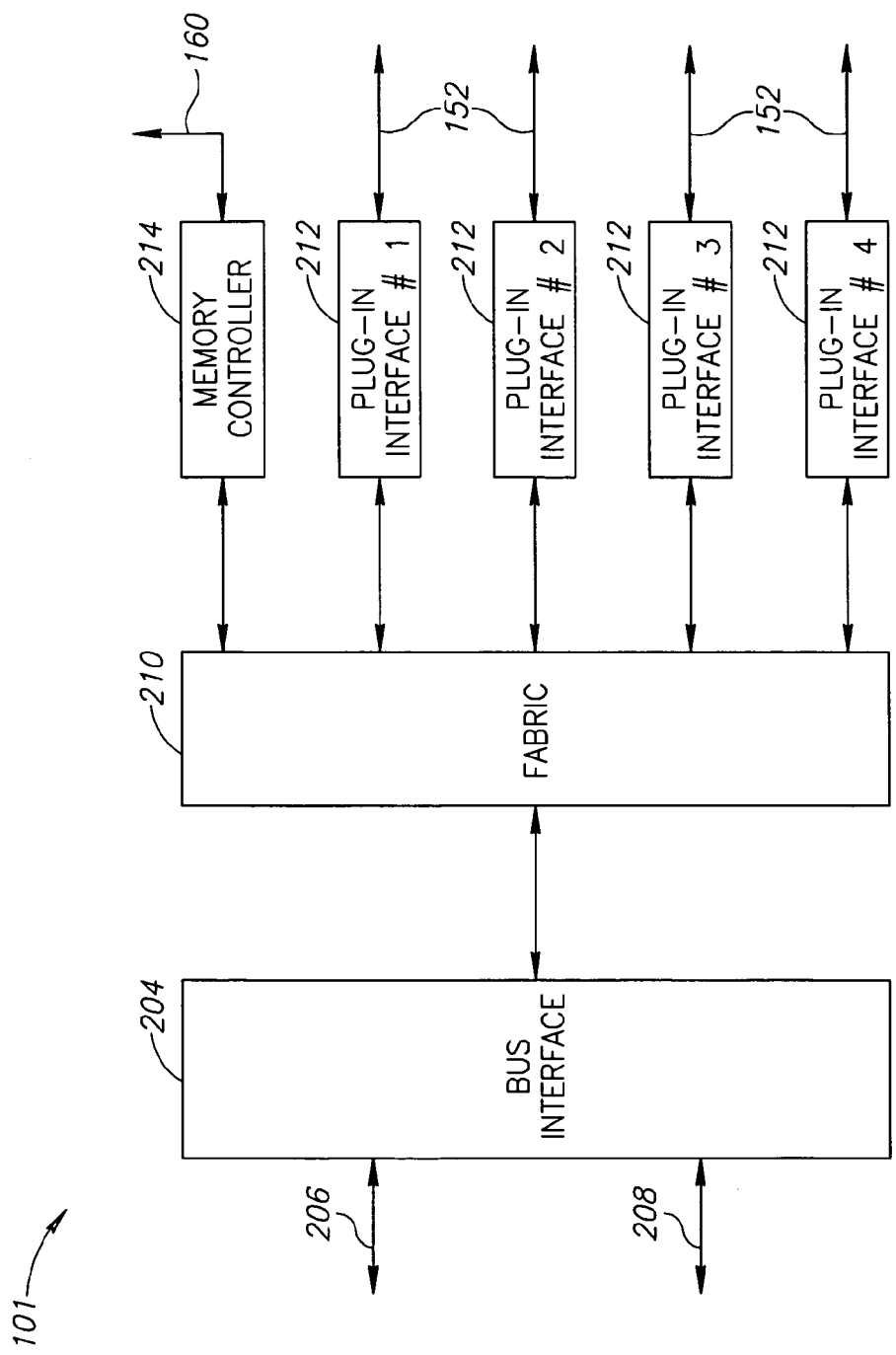
FIG. 2 is a schematic block diagram of an external interface unit of a communication board, in accordance with an exemplary embodiment of the invention.

FIG. 2 is a schematic block diagram of interface unit 101, in accordance with an exemplary embodiment of the invention. Interface unit 101 optionally includes a bus interface 204 which is configured to interface with the format of external signals received and transmitted by board 100. Signals from bus interface 204 are transferred to a Fabric 210 which schedules, arbitrates and/or directs the signals received from bus interface 204 to their destination modules 120. For each module 120, interface unit 101 optionally includes a respective plug-in interface unit 212, which encapsulates signals transmitted to the module in accordance with the internal format of board 100 and controls the transmission of the encapsulated signals to the module. Plug-in interface units 212 optionally also remove the internal format encapsulation of the processed signals received from their respective modules. A memory controller 214 optionally controls the transfer of signals to memory 103, over a data bus 160.

Interface unit 101 is optionally implemented using a field programmable gate array (FPGA) which is configured to a specific task by loading a firmware corresponding to the type of signals received by board 100 into the FPGA. In some embodiments of the invention, flash memory 104 stores a plurality of firmware processes for interface unit 101, corresponding to different external signal types and/or formats which board 100 is designed to operate with. When board 100 is inserted into an external rack and/or when board 100 is initialized, controller 102 determines the type of signals that board 100 is to receive from the external rack and accordingly instructs interface unit 101 on the firmware process it is to load automatically.

Optionally, the firmware processes stored in flash memory 104 only differ in the implementation of bus interface 204, while the other tasks are implemented using the same firmware segments for all types of signals. This is optionally due to the internal signal format used within board 100 for communication between interface unit 101 and modules 120.

In some embodiments of the invention, external interface line 130 includes a plurality of buses of different types, for example an Ethernet bus 206 (e.g., a Gigabit Ethernet bus) and a fast serial bus 208 (e.g., a PCI express bus). Optionally, at any specific time only one of the buses 206 and 208 is used, according to the external environment of board 100. Bus interface 204 is optionally configured according to the portion of external interface line 130 that is used and/or according to the specific format of the signals passing on external interface line 130.

For signals received on Ethernet bus 206, bus interface 204 is optionally configured to operate with a Gigabit Ethernet interface, in which case, bus interface 204 optionally includes a TDM conversion portion, which translates the Ethernet packets into time domain signals (iTDM). Bus interface 204 may optionally be configured with any of the following fast serial protocols: PCI-Ex, Adv. Sw, Rapid I/O, Fiber-Ch, SATA, Infiniband, Utopia and XAUI. Alternatively or additionally, any other set of types of interfaces may be supported by bus interface 204. It is noted that in some embodiments of the invention new bus interfaces of formats not existent when board 100 is produced may be added to interface unit 101 by simply adding a compatible firmware to flash memory 104.

Optionally, interface unit 101 is adapted to support at least two, at least four or even at least eight different external formats. Alternatively, in order to reduce the number of firmware processes that need to be stored in flash memory 104, less than four or even only one external format is supported.

Alternatively to implementing interface unit 101 using an FPGA, any other programmable unit which is sufficiently fast to handle the tasks of interface unit 101 at a sufficient rate may be used. Further alternatively, a hardware unit, such as an application specific integrated circuit (ASIC) is used to implement interface unit 101. Further alternatively, a plurality of non-programmable hardware processing units may be used to implement interface unit 101. A switch selects one of the non-programmable units which is to handle the incoming and outgoing signals, according to the external format in which the board is operating. The selection of a non-programmable unit is optionally performed under instructions from controller 102, according to the type of signals received by board 100 through board connectors 110. Optionally, controller 102 is notified the type of signals that board 100 is to receive, by an external controller with which board 100 interfaces.

In some embodiments of the invention, signals received by interface unit 101 are in packets carrying an IP address of a specific processor 132. Interface unit 101 directs the signals of the packet to the processor assigned the address in the packet. Alternatively, interface unit 101 determines on its own to which processor each packet is to be forwarded. For example, all packets may be received by interface 101 with a same IP address. Interface unit 101 optionally distributes the packets to the processors 132 according to the channels they belong to, the channels being assigned arbitrarily according to the load on the processors. Alternatively, the channels are distributed between the processors according to the types of signals carried by the channels. In some embodiments of the invention, interface unit 101 and/or controller 102 determine the number of processors that should be currently operative, according to the load on board 100. The handled channels are distributed between the currently operative processors and the other processors are optionally instructed to shut down in order to save on power consumption. When the operative processors 132 are close to their full capacity, another processor is optionally awaken in order to be ready when further channels are to be handled.

Other methods are optionally used, in some embodiments of the invention, to adjust the power consumption of board 100 dynamically, so as to reduce power consumption, when possible. In an exemplary embodiment of the invention, controller 102 controls the clock of board 100. Optionally, when board 100 is relatively loaded or is expected to be loaded, a high clock rate is used, while when the board 100 is expected to be relatively not loaded, a low clock rate is used.

Signals received by board 100 are not necessarily handled only by a single processor 132. In some embodiments of the invention, signals of at least some channels are provided to a first processor for a first processing stage and thereafter to a second processor for a second processing stage. The second processor may be included in the same module 120 as the first processor, or the processors may be included in two different modules 120.

Internal Signal Format

The internal signal format optionally includes an encapsulation of the received signals into packets. The encapsulation optionally includes a header and/or footer with a checksum (e.g., CRC) field, and an indication of an internal type of the signals (e.g., Ethernet, utopia) in the packet. The internal type of the signals optionally indicates an underlying format of the signals in the packet, which is used, for example, in determining a processor port through which the signals of the packet are to be provided to the processor.

In some embodiments of the invention, the encapsulation header also includes an address field which indicates, for signals directed to modules 120, the processor 132 on the destination module 120 to which the signals are directed. Optionally, the header also indicates the module to which the signals are directed. In some embodiments of the invention, however, the module is not indicated in the header, since in some embodiments the packets are forwarded to the module 120 on a bus leading only to that module. For signals transmitted from modules 120 to interface unit 101, the address field optionally indicates the processor that handled the signals. In some embodiments of the invention, the header also includes a field which indicates a channel to which the signals of the packet belong and/or a sequence number of the signals.

Translators

Figure 3:
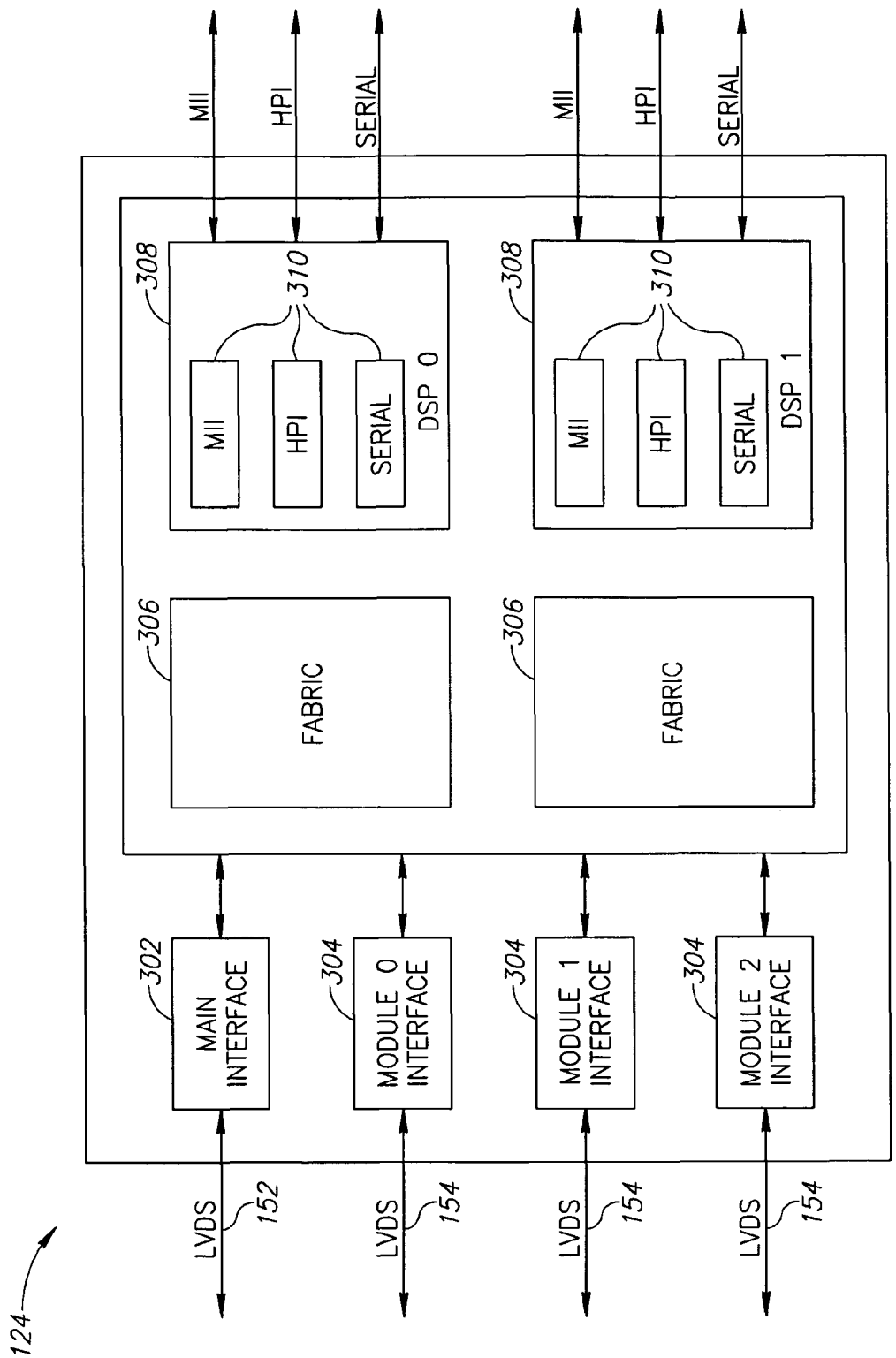
FIG. 3 is a schematic block diagram of a signal translator, in accordance with an exemplary embodiment of the invention.

FIG. 3 is a schematic block diagram of one of translators 124, in accordance with an exemplary embodiment of the invention. Translator 124 optionally includes a main interface 302 which controls exchange of signals over bus 152 with interface unit 101. Optionally, for each of the other modules 120 on board 100, translator 124 includes a module interface 304, which controls the exchange of signals with one of the other modules 120 over a respective bus 154. Interfaces 302 and 304 optionally remove the internal format encapsulation from signals they receive from outside the module 120 and add the encapsulation to signals they transmit outside of module 120.

For each of the processors 132 on the module 120 of translator 124, translator 124 optionally includes a buffer and scheduler (fabric) 306, which schedules the transfer of signals to its respective processor 132. Interfaces 302 and 304 optionally transfer the signals they receive to one of fabrics 306, according to the address field of the encapsulation of the received signals. It is noted that if a module 120 includes only a single processor 132, translator 124 of the module 120 includes only a single fabric 306. For each processor 132, translator 124 optionally further includes a signal adapter 308 which is specific to the type of processor 132 with which it is associated. In some embodiments of the invention, one or more of signal adapters 308 has a plurality of segments 310 for each format of signals which the processor 132 is adapted to receive. Optionally, the type of signals is identified in the encapsulation of the packet in the internal format of board 100. In some embodiments of the invention, each segment 310 provides the signals it handles to a respective port of processor 132, corresponding to the signals of the type handled by the segment.

In an exemplary embodiment of the invention, signal adapters 308 have segments for MII signals, HPI signals and serial signals.

Translators 124 are optionally implemented using FPGAs and/or any other programmable units that operate sufficiently fast for handling the signals on board 100. Optionally, flash memory 104 stores a plurality of firmware processes for implementation by translators 124. Optionally, when a module 120 with a new processor 132 is inserted to a slot 121, when a new processor 132 is inserted into a module 120 and/or when board 100 is initialized, controller 102 and/or interface unit 101 determines the type of processor(s) 132 serviced by the translator 124 and accordingly instructs flash memory 104 on the firmware process to be executed by the translator 124. This firmware process is optionally loaded automatically into translator 124.

In some embodiments of the invention, for modules having the same number of processors, the firmware processes of translators 124, differ only in the adapter 308 and have the same firmware for fabrics 306 and interfaces 302 and 304. The number of different firmware processes required for translators 124 optionally depends on the number of different types of processors 132 that can be placed in modules 120. It is noted that even after board 100 is produced, a new processor 132 can be utilized in the board, by generating a new plug-in module 120 including the processor and a compatible translator 124 and/or by generating a compatible firmware process for loading into the translator 124.

Alternatively to storing the firmware processes of translator 124 in flash memory 104, one or more of modules 120 has a local memory (e.g., flash, EPROM) in which the firmware processes for translator 124 are stored. Further alternatively or additionally, one or more of translators 124 is configured with a permanent firmware or is hardware encoded (e.g., in an ASIC) with the tasks for interfacing a specific processor 132. This alternative is optionally used for processors 132 that are permanently fixed to their module 120. When replacing the module 120 to a module having a different type of processor 132, the translator 124 is optionally also replaced. Alternatively to the local flash memory being included in module 120, the local flash memory may be located on board 100, near the slot 121 that receives the module, for example when the module does not have enough room for the local memory. In addition, locating the memory for the firmware directly on board 100 and not on module 120 reduces the cost of module 120 which is replaced more often than board 100.

Further alternatively or additionally, one or more of translators 124 operates with software processes.

Further alternatively or additionally, translator 124 is located on board 100 before slot 121, in order to make more room on module 120 for the processor (s) 132 of the module.

For simplicity of translators 124, in some embodiments of the invention, each module 120 hosts only a single type of processor 132. Alternatively, modules 120 may host a plurality of different types of processors and the firmware process of the translator 124 of the module is accordingly designed. This alternative requires a larger number of firmware processes. Therefore, in some embodiments of the invention, flash memory 104 includes a basic library of firmware processes for translators 124, which basic library includes a set of processes designed for the most commonly occurring module set ups. Optionally, the basic library only includes processes for modules in which all the processors are of the same type. When a module 120 with a plurality of different types of processors 132 is used, the translator 124 of the module is optionally loaded with a specifically designed firmware process not included in the basic library.

Reducing Module Cost

As mentioned above, in some embodiments of the invention, the permanent memory for firmware of translator 124 is located directly on board 100, in order to reduce the amount of hardware on replaceable module 120. In some embodiments of the invention, additional hardware units of modules 120 are located directly on board 100 rather than on the module. In one alternative embodiment, translator 124 is located directly on board 100. Alternatively or additionally, memories 126 and/or other peripheral units are located directly on board 100. Thus, the cost of modules 120 may be reduced.

Alternatives

Alternatively to using an internal format of board 100 for communication between interface unit 101 and modules 120, the communication between interface unit 101 and modules 120 is performed in one of the external formats handled by the board. It is noted, however, that the conversions needed to be performed by interface unit 101 may require very high rate intensive processing, and hence additional hardware beyond that described above is possibly required in order to perform the conversions.

Figure 4:
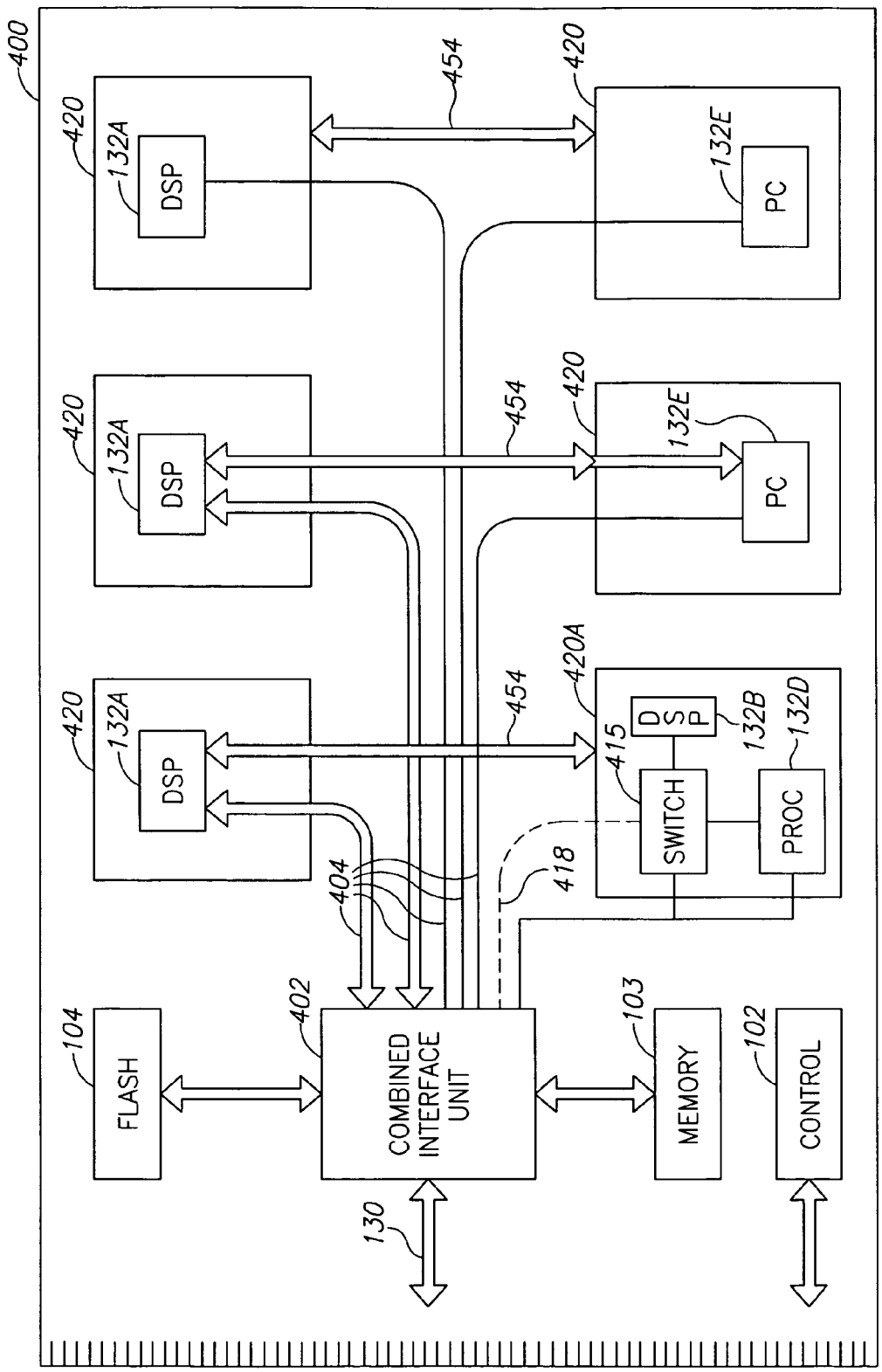
FIG. 4 is a schematic block diagram of major elements of a processing board, in accordance with another exemplary embodiment of the invention.

FIG. 4 is a schematic block diagram of major elements of a board 400, in accordance with another exemplary embodiment of the invention. Alternatively to the distributed signal conversion in board 100, board 400 includes a single combined interface unit 402 which performs the entire conversion of signals between processors 132 and the external environment. Combined interface 402 connects to processors 132 directly through buses 404. The use of a combined interface reduces the communication delay between interface line 130 and processors 132 caused by the time required for encapsulation of signals transmitted on buses 404. Optionally, in accordance with these embodiments, the number of types of signals supported by board 100 and/or by each of processors 132 is reduced, so that the complexity of combined interface unit 402 and the number of firmware processes stored in flash memory 104, is reasonable.

In an exemplary embodiment of the invention, board 400 supports only a single external format. This reduces the complexity of combined interface unit 402, so that it has more resources for interfacing with processors of different types of interfaces.

In some embodiments of the invention, combined interface unit 402 is implemented by an FPGA. Alternatively, interface unit 402 is implemented using a plurality of FPGAs and/or any other units which can support the large processing power required for performing the required signal conversions in a single central unit.

FIG. 4 also illustrates other alternatives which may be implemented in the embodiments of the present invention. Board 402 includes six modules 420 and each module has only a single processor 132. It will be understood to those skilled in the art that at least some of the modules 420 may include two or more processors 132, as illustrated by module 420A. Optionally, in accordance with this option, modules having more than one processor 132 include a switch 415 which directs the signals from the corresponding bus 404 to the appropriate processor 132 of the module 420. The switch 415 is optionally controlled by combined interface unit 402 through a dedicated control line 418. Alternatively or additionally, control signals to the switch are transmitted with the data signals on bus 404. Further alternatively, each processor 132 is connected through a separate bus 404 to combined interface unit 402.

FIG. 4 also illustrates the use of a limited number of intra module buses 454. In board 400, modules 420 are organized in pairs which are connected to each other. Communication with modules outside the pair are optionally performed through combined interface unit 402. It is noted that in the embodiment illustrated in FIG. 5, immediately following, the modules are not connected through intra module buses at all. Similarly, the embodiments in FIGS. 1 and 4 may be adapted not to have intra-module buses.

Figure 5:
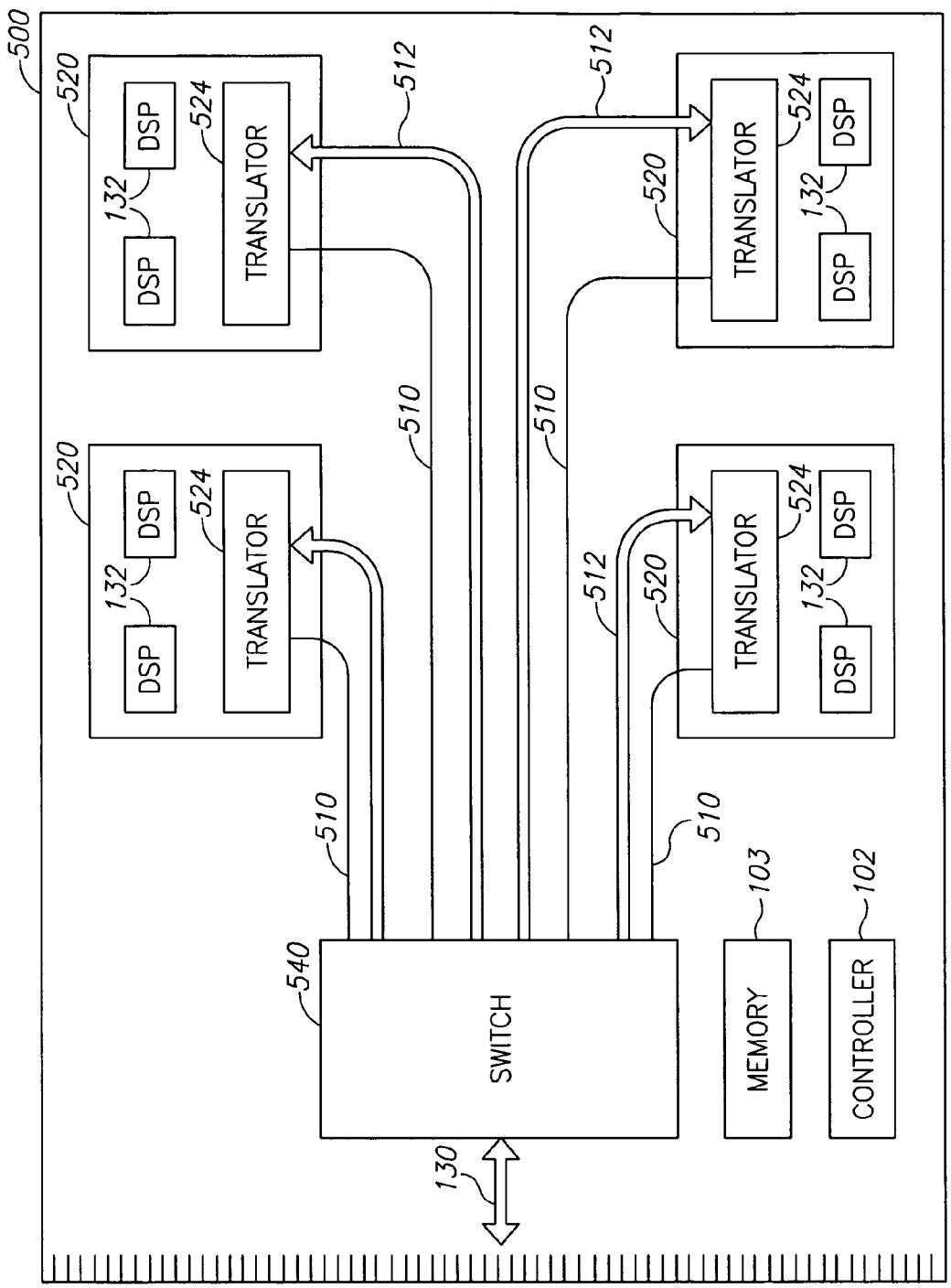
FIG. 5 is a schematic block diagram of major elements of a processing board, in accordance with still another exemplary embodiment of the invention.

FIG. 5 is a schematic block diagram of major elements of a board 500, in accordance with still another exemplary embodiment of the invention. In board 500, each module 520 has a translator 524 which performs the entire signal conversion from an external format to the format of signals of processors 132. A simple switch 540 directs the signals to their destination module 520. In some embodiments of the invention, board 500 includes a plurality of buses for each module 520, connecting the module to switch 540. Optionally, for each module 520, board 500 includes a fast serial bus 510 and an Ethernet bus 512. The bus actually used at any time depends on the format of the signals received from the external board rack.

Figure 6:
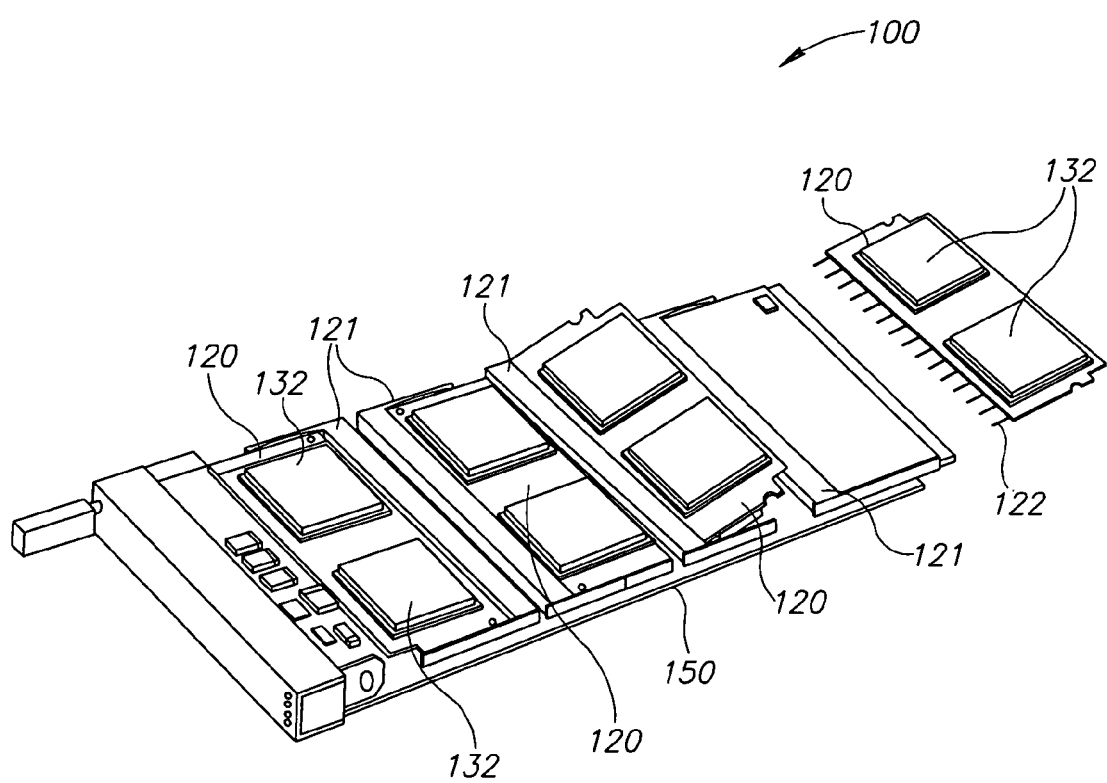
FIG. 6 is a schematic view of a processing board, in accordance with an exemplary embodiment of the invention.

FIG. 6 is a schematic view of board 100, in accordance with an exemplary embodiment of the invention. Board 100 includes a substrate 150 and four slots 121 adapted to receive connectors 122 of plug-in modules 120. Each of modules 120 is shown with two processors 132 on one of its faces. Other units included in modules 120 are optionally positioned on the opposite face of the module. Alternatively or additionally, any other module configurations may be employed to utilize the area of modules 120.

The plug-in modules 120 (which in the embodiment of FIG. 6 are detachable from substrate 150) are optionally mounted onto substrate 150 parallel to the substrate, so as not to change excessively the thickness of the board, e.g., not to increase the thickness by more than 200-300%.

In some embodiments of the invention, substrate 150 has a longest dimension (length) of less than 200 mm, or even less than 160 mm. Optionally, substrate 150 has a width of less than 100 mm, or even less than 75 mm. In some embodiments of the invention, substrate 150 has an area of less than 200 square centimeters, less than 150 square centimeters or even less than 120 square centimeters.

Each of processors 132 optionally has a processing power of at least 1 MIPS, 20 MIPS or even at least 100 MIPS. In some embodiments of the invention, processors 132 operate with a clock of at least 50 MHz, 100 MHz or even at least 200 MHZ.

Processors 132 are optionally organized logically in parallel to each other, such that signals received from an external interface of board 100 can be directed to any of the processors 132 without necessarily passing through any other of the processors.

Optionally, modules 120 are hot swappable. Alternatively or additionally, board 100 in its entirety is hot swappable.

It should be appreciated that the above described description of methods and apparatus are to be interpreted as including apparatus for carrying out the methods and methods of using the apparatus. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that at least some of the above described embodiments include non-limiting details which were provided by way of example for illustration purposes and/or to describe the best mode contemplated by the inventors and therefore may include structure, acts or details of structures and acts that are not essential to the invention. Structure and acts described herein are replaceable by equivalents which perform the same function, even if the structure or acts are different, as known in the art. Many specific implementation details may be used. For example, processors 132 may include a single core or may include a plurality of cores. Therefore, the scope of the invention is limited only by the elements and limitations as used in the claims.

The invention claimed is:

1. A signal processing board, comprising:
a resource board substrate;
an external interface on the board substrate, adapted to receive signals for processing;
at least one slot adapted to receive a plug-in module with at least one processor thereon; and
an interface unit adapted to at least participate in converting signals exchanged between the external interface and a processor on a module received by the slot, between a format of signals received by the external interface and a signal format of the processor,
wherein the interface unit is suitable to at least participate in the conversion for a plurality of types of processors, differing in the format in which they transmit or receive signals.

2. A board according to claim 1, wherein the external interface comprises an AMC interface.

3. A board according to claim 1, wherein the interface unit is adapted to convert signals from the external interface into a format which is independent of the format of signals received by the external interface, except for characteristics of the format that effect the provision of the signals to the processor.

4. A board according to claim 1, wherein the interface unit is adapted to convert signals from the external interface into a format which is independent of a type of processor to which the signals are directed.

5. A board according to claim 1, wherein the interface unit is adapted to encapsulate signals from the external interface into packets in a format internal to the board and to send the encapsulated signals on toward the at least one slot.

6. A board according to claim 1, wherein the interface unit comprises a software or firmware configurable unit and wherein the board comprises a memory configured with a plurality of software or firmware processes from which a process is selected for the interface unit, according to a format of signals received by the external interface.

7. A board according to claim 1, comprising at least one module inserted into the at least one slot, the at least one module including one or more processors mounted thereon.

8. A board according to claim 7, comprising a translator mounted on the module, adapted to perform signal conversion tasks not performed by the interface unit, in converting between a format of signals received by the external interface and a format of the processor.

9. A board according to claim 8, comprising a memory storing at least one software or firmware process executable by the translator.

10. A board according to claim 9, wherein the memory storing the at least one process executable by the translator is mounted on the module including the translator.

11. A plug-in module, comprising:
a module substrate including a connector adapted to fit in a slot of a processing board;
at least one processor mounted on the module substrate; and
at least one translator mounted on the module substrate, configured to convert signals directed to the at least one processor into a format supported by the processor.

12. A module according to claim 11, wherein the at least one translator is configurable with a software or firmware stored in a memory of a processing board on which the module is mounted.

13. A signal processing board, comprising:
a resource board substrate;
an external interface on the board substrate, adapted to receive signals for processing;
at least one processing module including at least one processor therein, mounted on the substrate; and
an interface unit adapted to at least participate in converting signals exchanged between the external interface and a processor of a module, between a format of signals received by the external interface and a signal format of the processor, wherein the interface unit is suitable to at least participate in the conversion for a plurality of types of processors, differing in the format in which they transmit or receive signals.

14. A board according to claim 13, wherein the at least one processing module is detachably mounted on the substrate.

15. A board according to claim 13, wherein the interface unit is adapted to receive signals from the external interface and encapsulate the signals into packets in a format internal to the board.

16. A board according to claim 13, comprising one or more translators adapted to receive packets from the interface unit, to remove the encapsulation and to convert signals from the packets into a format of one of the processors.

17. A multi-processor signal processing board, comprising:
a resource board substrate;
an external interface on the board substrate, adapted to receive signals for processing;
a plurality of processors mounted on the substrate arranged in a logical array of signal handling processors; and
an interface unit adapted to receive signals from the external interface and direct the signals to one or more of the processors for handling,
wherein at least two of the processors have different types of interfaces connecting to the interface unit.

18. A board according to claim 17, wherein the external interface comprises an AMC interface.

19. A board according to claim 17, comprising one or more translators adapted to convert signals directed to each of the processors into a format of the processor to which the signals are directed.

20. A board according to claim 19, wherein the one or more translators comprise field programmable gate arrays FPGAs.

21. A board according to claim 17, wherein the at least two processors of different types of external interfaces differ in the protocols in which they expect to receive signals.

22. A board according to claim 17, wherein the interface unit comprises a field programmable gate array FPGA.

23. A board according to claim 1, wherein the external interface is adapted to receive signals in accordance with a plurality of external formats and wherein the interface unit is configurable to participate in converting signals of a plurality of external formats.

24. A board according to claim 1, wherein the interface unit comprises a field programmable gate array FPGA.

* * * * *